(12) United States Patent
    Moss

(10) Patent No.: US 9,583,929 B1
(45) Date of Patent: *Feb. 28, 2017

(54) INTERRUPTIBLE UNIVERSAL WALL BOX AND METHODS OF USE THEREOF

(71) Applicant: J Moss, Roswell, GA (US)

(72) Inventor: J Moss, Roswell, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/013,464

(22) Filed: Feb. 2, 2016

Related U.S. Application Data

(63) Continuation-in-part of application No. 14/841,064, filed on Aug. 31, 2015.

(51) Int. Cl.

| | |
|---|---|
| *H01R 13/60* | (2006.01) |
| *H02G 3/18* | (2006.01) |
| *H02G 3/16* | (2006.01) |
| *H02J 3/00* | (2006.01) |
| *H01R 24/52* | (2011.01) |
| *H01R 13/639* | (2006.01) |
| *H01R 25/00* | (2006.01) |

(52) U.S. Cl.
CPC .............. *H02G 3/18* (2013.01); *H02G 3/16* (2013.01); *H02J 3/00* (2013.01); *H01R 13/6395* (2013.01); *H01R 24/525* (2013.01); *H01R 25/006* (2013.01)

(58) Field of Classification Search
None
See application file for complete search history.

(56) References Cited

U.S. PATENT DOCUMENTS

| | | | | |
|---|---|---|---|---|
| 4,756,695 A | * | 7/1988 | Lane ..................... | H01R 24/62 |
| | | | | 439/535 |
| 4,958,048 A | * | 9/1990 | Bell ....................... | H02G 3/18 |
| | | | | 174/53 |
| 8,172,589 B2 | * | 5/2012 | Johnson ................ | H01R 25/16 |
| | | | | 174/60 |
| 2014/0118892 A1 | * | 5/2014 | Makwinski ............ | H02G 3/26 |
| | | | | 361/675 |

* cited by examiner

*Primary Examiner* — Tho D Ta
(74) *Attorney, Agent, or Firm* — Mathew L. Grell; Grell & Watson Patent Attorneys

(57) ABSTRACT

An electrical wall box having plurality of wire power terminals on exterior of electrical wall box, wire power terminals are electrically connected to one of plurality of insulated distribution busses within electrical wall box, each distribution buses having one or more interrupt bus switches electrically connected therein; each distribution buses has first quick connect terminal electrically connected thereto one distribution buses; wherein electrical wall box further includes plurality of switch wiring terminals on an exterior of electrical wall box, each plurality of switch wiring terminals includes insulated electrical tap connecting one switch wiring terminals to one plurality of internal insulated distribution busses or to quick connect terminal within electrical wall box; one or more pluggable electrical receptacles, each one or more pluggable electrical receptacles includes two or more second quick connect terminals to electrically connect thereto one of said one or more first quick connect terminals; and cover plate.

33 Claims, 9 Drawing Sheets

INTERRUPTIBLE UNIVERSAL WALL BOX AND METHODS OF USE THEREOF

CROSS-REFERENCE TO RELATED APPLICATION

To the full extent permitted by law, the present United States Non-provisional Patent Application is a Continuation-in-Part of United States Non-provisional Application entitled "Plugable Electrical Receptacle and Universal Wall Box and Methods of Use Thereof," having assigned Ser. No. 14/841,064, filed on Aug. 31, 2015, incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND

Technical Field of the Invention

The present invention relates generally to electrical receptacles or fixtures, and more specifically to pluggable quick connect electrical receptacles or fixtures and wall box.

Description of Related Art

During construction of buildings, both commercial and residential, it is common to provide an electrical wall box for receiving an electrical receptacle, such as, an outlet or a switch. The electrical wall box is typically secured to the side of a vertical stud. Once the wall box is installed, wallboard is typically installed over the studs and an opening is cut in the wallboard in order to pass the electrical receptacle through the wallboard into the wall box. Electrical wiring from a power source or load enters the wall box via an opening therein, wherein the electrical wiring is accessible from the front of the wall box for electrical connection thereto the electrical receptacle.

To complete the installation of the electrical receptacle, stub wires electrically connected to the electrical receptacle are secured to corresponding wires in the wall box, such as, via wire nuts, or wires in the wall box are directly terminated on the electrical receptacle, such as via screw terminals or friction connect terminals and the electrical receptacle is secured, typically via screws that engage tubular openings (threaded or unthreaded—for self-tapping screws) in the wall box. Subsequently, a decorative cover plate is installed over the receptacle, by securing the cover plate, such as, via screws that engage threaded openings in the electrical receptacle.

Whenever a building is undergoing renovation, the existing receptacles and their cover plates are often in need of replacement or may simply need to be replaced to provide a different appearance or function. Further, it is often necessary to replace a single, defective electrical receptacle.

In order to replace such existing receptacle, power to the box must be interrupted by switching off the power to the wall box. Once the old cover plates and receptacles are electrically disconnected, typically a new receptacle is installed by securing the wires of the new receptacle to their corresponding wires in the wall box (step one), securing the receptacle to the wall box (step two), and, subsequently, securing a new cover plate over the replaced receptacle (step three). All of these steps are labor intensive, such as require considerable skill and manual dexterity to bend and manipulate the heavy gauge power wires and mentally challenging to understand the complex wiring schemes and generally require the services of a licensed electrician, resulting in higher costs than would otherwise be incurred through a simpler apparatus and method of installation.

When installing an electrical receptacle to a wall box, the receptacle has openings for fasteners to engage the wall box receiving apertures. Once the receptacle is installed, the cover plate is secured via fasteners through different openings.

In use, a home or business owner, parent, apartment owner, police, or rescue personnel may wish to interruptible, disable or power down an individual outlet or switch, individual wall box, set of wall boxes, room of wall boxes, unit of wall boxes, floor of wall boxes, building or home of wall boxes.

Therefore, it is readily apparent that there is recognizable unmet need for a pluggable electrical receptacle and universal wall box and methods of use thereof that reduces installation time, wiring complexity to electrically connect a receptacle to a wall box, enable interrupting or disabling of a switch, receptacle, wall box or set of wall boxes.

BRIEF SUMMARY

Briefly described, in an example embodiment, the present disclosure overcomes the above-mentioned disadvantages and meets the recognized need for a interruptible universal wall box and methods of use thereof, including, in general, includes an electrical wall box having a plurality of wire in and wire out power terminals on an exterior of the electrical wall box, wherein each set of wire in and wire out power terminals are electrically connected to one of a plurality of internal insulated distribution busses within the electrical wall box, each of the distribution buses has one or more first quick connect terminals electrically connected thereto one of the distribution buses; each of the distribution buses having one or more interrupt or disable bus switches electrically connected therein; wherein electrical wall box further includes a plurality of switch wiring terminals on an exterior of the electrical wall box, each of the plurality of switch wiring terminals includes an insulated electrical tap connecting one of the switch wiring terminals to one of the plurality of internal insulated distribution busses or to a quick connect terminal within the electrical wall box; one or more pluggable electrical receptacles, each of the one or more pluggable electrical receptacles includes two or more second quick connect terminals to electrically connect thereto one of said one or more first quick connect terminals; and a cover plate.

According to its major aspects and broadly stated, the present disclosure in its preferred form is a universal electrical wall box capable of electrically quick connecting thereto an interchangeable electrical receptacle, in each slot or bay within the electrical wall box, whether the electrical receptacle is a switch, receptacle (pin or blade style), fan switch, dimmer, decorative switch, wireless switch, occupancy sensor switch, or the like.

Accordingly, a feature of the pluggable electrical receptacle and universal wall box and methods of use thereof is its ability to provide a pluggable electrical receptacle which requires no particular skill or tools to install or change, and which can be changed without interrupting the power supply to the universal wall box or universal wall boxes down line.

Another feature of the pluggable electrical receptacle and universal wall box and methods of use thereof is its ability to provide wire in and wire out power terminals on the exterior of the box to power and pass power therethrough the electrical wall box on to the next wall box and power internal insulated distribution busses configured to electrically connect with removable electrical receptacles.

Still another feature of the pluggable electrical receptacle and universal wall box and methods of use thereof is the ability to provide switch wiring terminals includes an insulated electrical tap connecting one of the switch wiring terminals on the exterior of the box to power and pass power therethrough to switchable loads, such as lights, fans, electronic devices and the like via insulated electrical taps connecting one of the switch wiring terminals to one of the plurality of internal insulated distribution busses or to a quick connect terminal.

Yet another feature of the pluggable electrical receptacle and universal wall box and methods of use thereof is the ability to avoid the usual crimping and twisting required in conventional power outlets, the universal wall box being configured to receive a removeable plug-in electrical receptacle.

Yet another feature of the pluggable electrical receptacle and universal wall box and methods of use thereof is the ability to avoid the use of a junction device(s) between the universal wall box and pluggable electrical receptacles, whether switch, receptacle (pin or blade style), fan switch, dimmer, decorative switch, wireless switch, occupancy sensor switch, or the like.

Yet another feature of the pluggable electrical receptacle and universal wall box and methods of use thereof is the ability to city or county official's time to conduct a rough electrical inspection due to distinct identification of and separation of switch wiring terminals from wire in and wire out power terminals, thus assisting the inspector with quick identification of wiring configurations.

Yet another feature of the pluggable electrical receptacle and universal wall box and methods of use thereof is the ability to enable an electrician to move from junction box to junction box post inspection or completion of drywall to install electrical receptacles, whether switch, receptacle (pin or blade style), fan switch, dimmer, decorative switch, wireless switch, occupancy sensor switch, or the like.

Yet another feature of the pluggable electrical receptacle and universal wall box and methods of use thereof is the ability to minimize connecting and/or splicing wires using wire nuts.

Yet another feature of the pluggable electrical receptacle and universal wall box and methods of use thereof is the ability to reduce the installation complexity by eliminating the need for jumper wires, so as the number of wires increases, the possibility of incorrectly interconnecting, misterminating, or splicing the wires.

Yet another feature of the pluggable electrical receptacle and universal wall box and methods of use thereof is the ability to reduce the possibility of miswiring the circuit with wire in and wire out power terminals, and plurality of switch wiring terminals on an exterior of the electrical wall box.

In an exemplary embodiment of the pluggable electrical receptacle and universal wall box and methods of use thereof, a universal wall box, said universal wall box comprising an open side electrical box having a plurality of sets of wire in and wire out power terminals integral to an exterior of one or more box surfaces of said electrical box, wherein each said set of wire in and wire out power terminals are electrically connected to one of a plurality of internal insulated distribution busses integrated within said one or more box surfaces of said electrical box, and wherein each of said internal insulated distribution busses includes one or more first quick-connector electrically connected thereto and exposed to an interior of said one or more box surfaces, and a plurality of switch wiring terminals integral to said exterior of said one or more box surfaces of said electrical box, wherein each of said switch wiring terminals are electrically connected to one of a plurality of insulated electrical taps integrated within said one or more box surfaces of said electrical box, and wherein at least one of said plurality of insulated electrical taps includes at least one second quick-connector electrically connected thereto and exposed to an interior of said one or more box surfaces, and wherein each of at least two or more of said plurality of insulated electrical taps is electrically connected to one said plurality of internal insulated distribution busses.

In a further exemplary embodiment the pluggable electrical receptacle and universal wall box and methods of use thereof, a ganged universal wall box, said ganged universal wall box comprising an open side electrical box having a plurality of sets of wire in and wire out power terminals integral to an exterior of one or more box surfaces of said electrical box, wherein each said set of wire in and wire out power terminals are electrically connected to one of a plurality of internal insulated distribution busses integrated within said one or more box surfaces of said electrical box, and one or more bays within said open side electrical box, each said bay includes: one or more first quick-connector electrically connected thereto said internal insulated distribution busses exposed to an interior of said one or more box surfaces, and a plurality of switch wiring terminals integral to said exterior of said one or more box surfaces of said electrical box, wherein each of said switch wiring terminals are electrically connected to one of a plurality of insulated electrical taps integrated within said one or more box surfaces of said electrical box, and wherein at least one of said plurality of insulated electrical taps includes at least one second quick-connector electrically connected thereto and exposed to an interior of said one or more box surfaces, and wherein each of at least two or more of said plurality of insulated electrical taps is electrically connected to one said plurality of internal insulated distribution busses.

In the course of either an initial installation or for remodeling, an electrical wall box/receptacle/cover plate combination is obtained for installation.

Accordingly, a feature pluggable electrical receptacle and universal wall box and methods of use thereof is its ability to reduce labor costs for initial installation and for retrofitting of electrical fittings.

Yet another feature of the pluggable electrical receptacle and universal wall box and methods of use thereof is the ability to reduce the number of stock keeping units for inventory purposes.

Yet another feature of the pluggable electrical receptacle and universal wall box and methods of use thereof is the ability to be quickly installed.

Yet another feature of the pluggable electrical receptacle and universal wall box and methods of use thereof is the ability to be utilized with a variety of electrical components.

Yet another feature of the pluggable electrical receptacle and universal wall box and methods of use thereof is that it requires only simple tools for installation.

Yet another feature of the pluggable electrical receptacle and universal wall box and methods of use thereof is that it is secured via fewer fasteners than is required by typical electrical fixtures.

Yet another feature of the interruptible universal wall box and methods of use thereof is that one or more buses include a disable switch, which preferably is normally closed but can be opened to disable such bus from feeding power to one or more switches or receptacles plugged into the wall box.

Yet another feature of the interruptible universal wall box and methods of use thereof is that a local or remote user may interrupt one or more buses in any wall box to disable one or more switches or receptacles plugged into the wall box.

These and other features of the pluggable electrical receptacle and universal wall box and methods of use thereof will become more apparent to one skilled in the art from the Brief Description of the Drawings, Detailed Description of exemplary embodiments thereof, and Claims when read in light of the accompanying Drawings or Figures.

BRIEF DESCRIPTION OF THE DRAWINGS

The present pluggable electrical receptacle and universal wall box and methods of use thereof will be better understood by reading the Detailed Description of exemplary embodiments thereof with reference to the accompanying drawing figures, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-8, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claimed invention may, however, be embodied in many different forms and should not be construed to be limited to the embodiments set forth herein. The examples set forth herein are non-limiting examples, and are merely examples among other possible examples.

Electrical language used herein may be used interchangeably, such as black-power-hot, white-neutral, and green-ground.

Figure 1:
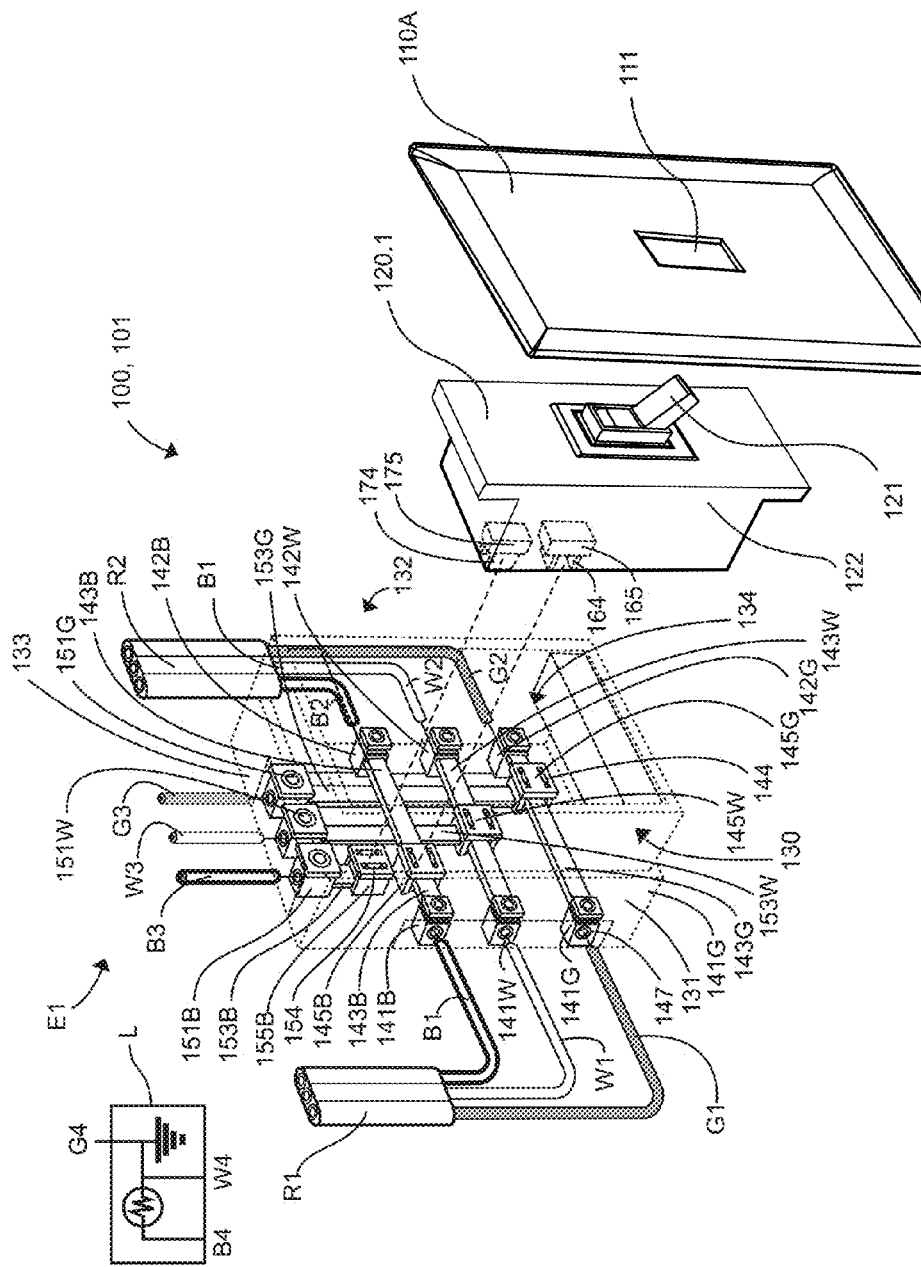
FIG. 1 is a perspective exploded view of an exemplary embodiment of pluggable electrical switch and universal wall box and methods of use thereof, and a switch cover plate.
Figure 2:
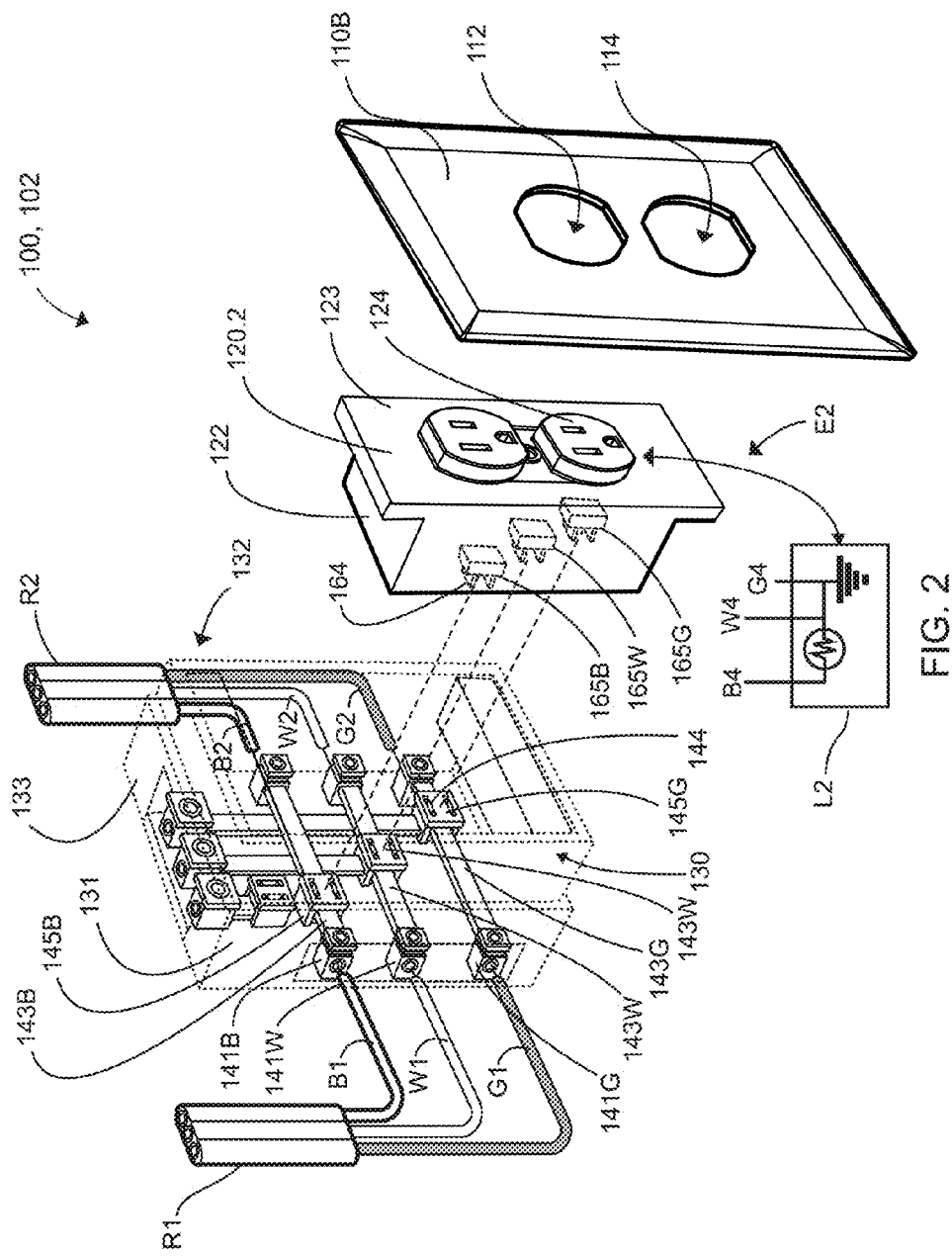
FIG. 2 is a perspective exploded view of an exemplary embodiment of pluggable electrical outlet and universal wall box and methods of use thereof, and an outlet cover plate.
Figure 6:
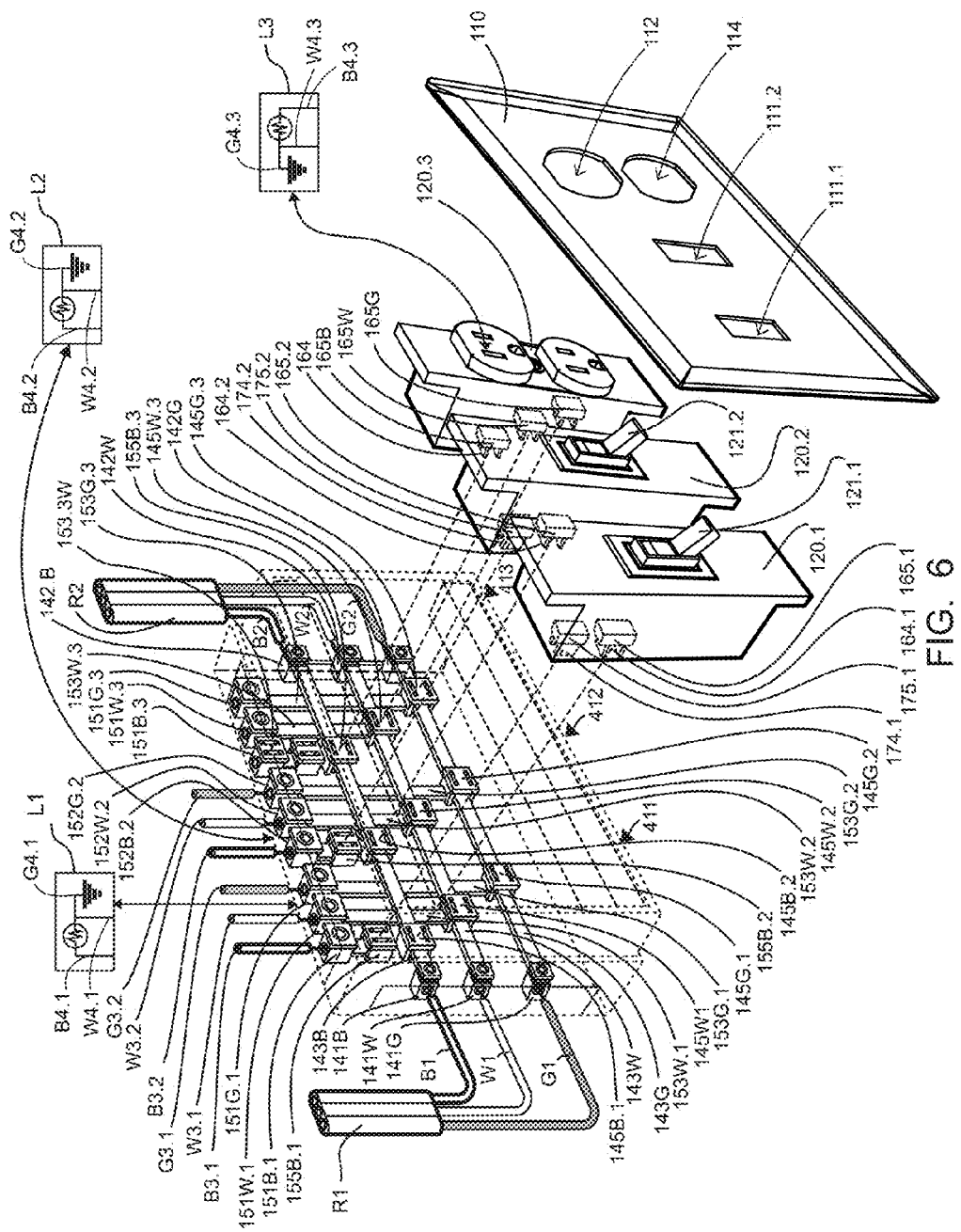
FIG. 6 is a perspective exploded view of an exemplary embodiment of pluggable electrical receptacles and ganged universal wall box and methods of use thereof, and ganged cover plate.

Referring now to FIGS. 1, 2, and 6 by way of example, and not limitation, therein is illustrated an example embodiment electrical receptacle assembly 100, wherein electrical receptacle assembly 100 includes cover plate 110A, electrical components or receptacles 120, and a single or multiple bay electrical wall box, such as universal wall box 130. Preferably, universal wall box 130 is configured as a square or rectangular as a five sided box with an open side, having opening, open side, or interior surface 134, and relevant sides having interior and exterior surfaces, one or more box surfaces, being first box side 131, second box side 132, and third box side 133. Moreover, exterior surface, such as first box side 131 may include a plurality of power wiring terminals integrated therein, such as first power terminals 141, which includes first power terminal (in/black/hot/first) 141B, first power terminal (in/white/neutral/second) 141W, and first power terminal (in/green/ground/third) 141G. Furthermore, exterior surface, such as second box side 132 may include a plurality of power terminals integrated therein, such as second power terminals 142, which includes second power terminal (out/black/hot/first) 142B, second power terminal (out/white/neutral/second) 142W, and second power terminal (out/green/ground/third) 142G. First power terminals 141 and second power terminals 142 may be configured as releasable electrical wire terminals using set screw, spring contact, stab-in or the like electrical wire connectors. Positioned therebetween and electrically connecting each of first power terminals 141 and second power terminals 142 is preferably positioned one or more insulated electrical busses 143, wherein first insulated electrical bus 143B is preferably positioned therebetween and electrically connecting first power terminal (black) 141B thereto second power terminal (black) 142B, second insulated electrical bus 143W is preferably positioned therebetween and electrically connecting first power terminal (white) 141W thereto second power terminal (white) 142W, and third insulated electrical bus 143G is preferably positioned therebetween and electrically connecting first power terminal (green) 141G thereto second power terminal (green) 142G. Preferably, each of the one or more insulated electrical busses 143 preferably includes first electrical quick-connector or at least three electrical outlet connectors exposed to an interior surface 134, such as a first electrical quick connector 145 having one or more openings, such as electrical connector access 144 to access an uninsulated portion of one or more insulated electrical busses 143, such as first electrical or outlet quick connector terminal 145B electrically connected thereto first insulated electrical bus 143B, second electrical or outlet quick connector terminal 145W electrically connected thereto second insulated electrical bus 143W, and third electrical or outlet quick connector terminal 145G electrically connected thereto third insulated electrical bus 143G. It is recognized herein that electrical quick-connectors 145 may be staggered thereon one or more insulated electrical busses 143 to enable electrical separation therebetween electrical quick connectors 145.

It is contemplated herein that power wires or wiring, such as ROMEX sets of wire or wiring R having a plurality of individually sheathed or insulated electrical wires therein, such as first power wire (black/hot) B, second power wire (white/neutral) W, and third power wire (green/ground) G, wherein wiring R1 having first power wire B1, second power wire W1, and third power wire G1 is preferably electrically connected such as, first power wire B1 electrically connects to first power terminal (black) 141B, second power wire W1 electrically connects to first power terminal (white) 141W, and third power wire G1 electrically connected to first power terminal (green) 141G. Likewise, wiring R2 having first power wire B2, second power wire W2, and third power wire G2 is preferably electrically connected such as, first power wire B2 electrically connects to second power terminal (black) 142B, second power wire W2 electrically connects to second power terminal (white) 142W, and third power wire G2 electrically connects to second power terminal (green) 142G. Power, neutral, and ground supplied to universal wall box 130 may arrive via either wiring R1 or wiring R2 and respectively the other wiring R2 or wiring R1, may power the next wall box in series, and so on, respectively.

Still furthermore, exterior surface, such as third box side 133, may include a plurality of switch wiring terminals integral therein, such as first switch terminals 151, which includes first switch terminal (black/hot/first) 151B, first switch terminal (white/neutral/second) 151W, and first switch terminal (green/ground/third) 151G. Switch terminals 151 may be configured as releasable electrical wire terminals using set screw, spring contact, stab-in or the like electrical wire connectors. Switch terminals 151 are preferably electrically connected to an insulated electrical buss, via insulated electrical taps 153, wherein first insulated electrical tap 153B is preferably electrically connecting first switch terminal (black) 151B thereto second electrical quick-connector, such as fourth electrical quick connector terminal 155B (electrical quick connector 155 includes one or more openings, such as electrical connector access 154 to access an uninsulated portion of one or more first insulated electrical tap 153, such as first insulated electrical tap 153B), second insulated electrical tap 153W is preferably electrically connecting first switch terminal (white) 151W thereto second insulated electrical bus 143W, and third insulated electrical tap 153G is preferably electrically connecting first switch terminal (green) 151G thereto third insulated electrical bus 143G. It is recognized herein that electrical quick connectors 155 may be staggered thereon one or more insulated electrical tap 153 to enable electrical separation therebetween electrical quick-connectors 155/145.

It is contemplated herein that electrical quick-connector 145 having electrical connector access 144 and electrical quick connectors 155 having one or more electrical connector access 154, that such accesses may be oriented or configured differently in order to enable electrical separation or distinction therebetween electrical quick connector 145 and electrical quick connectors 155, so as to prevent incorrect electrical connections.

It is contemplated herein switch wiring R3 having first switch wire B3, second switch wire W3, and third switch wire G3 is preferably electrically connected such as, first switch wire B3 electrically connected to first switch terminal (black) 151B, second switch wire W3 electrically connected to first switch terminal (white) 151W, and third switch wire G3 electrically connected to first switch terminal (green) 151G. Preferably, first switch wire B3, second switch wire W3, and third switch wire G3 power a load or resistance, such as first load L having first wire B4, second wire W4, and third wire G4, wherein first load wire B4 is preferably electrically connected to first switch wire B3, second load wire W4 is preferably electrically connected to second switch wire W3, and third load wire G4 is preferably electrically connected to third switch wire G3 to make up or establish an electrical circuit or connection, such as first electrical circuit E1.

Referring again to FIG. 1 by way of example, and not limitation, therein is illustrated an example embodiment of electrical switch 120.1 and cover plate 110. Electrical switch 120.1 preferably includes toggle 121, housing or body 122, and at least two third quick-connectors or electrical switch quick-connectors, such as first electrical switch quick connector 165 and second electrical switch quick connector 175 having one or more electrical contacts or connectors, such as first connector blade 164 and second connector blade 174, respectively. It is contemplated herein that electrical quick connector 145 having first electrical connector access 144 may mate, plug-in, or make an electrical connection with first connector blade 164 of electrical quick connector 165 and opposite or different oriented electrical quick connectors 155 having second electrical connector access 154 may mate, plug-in, or make an electrical connection with second connector blade 174 of second electrical quick connector 175 to make up or establish an electrical switch 101 as electrical receptacle assembly 100 to switch on and off first electrical circuit E1. Preferably, first connector blade 164 and second connector blade 174 may be positioned or oriented different from the other (ninety degrees rotated from the other) to prevent errors in installation of incorrect receptacles 120. Installation of electrical switch 120.1 preferably therein body 122 may be accomplished via, screw and hole, latch, fastener, friction fit, plug in or the like known to one of ordinary skill in the art.

It is recognized herein that cover plate 110 may include aperture 111 to accommodate toggle 121, and is utilized to cover electrical switch 120.1.

In use, toggle 121 is in a first open position of an open circuit not powering first load L via no circuit connection between first load L (fourth electrical quick connector terminal 155B and first electrical quick connector terminal 145B), whereas first load L second wire W4, second wire W3, first switch terminal (white) 151W, second insulated electrical tap 153W, second electrical quick connector terminal 145W, second insulated electrical bus 143W is a completed connection to first power terminal (white) 141W/142W and second wire W1/W2; and third wire G4, third wire G3, first switch terminal (green) 151G, third insulated electrical tap 153G, third electrical quick connector terminal 145G, third insulated electrical bus 143G, is a completed connection to first power terminal (green) 141G/142G and third wire G1/G2.

To complete the circuit and power first load L, toggle 121 is moved to a second closed position of a closed circuit powering first load L via first wire B4, first wire B3, first switch terminal (black) 151B, first insulated electrical tap 153B, fourth electrical quick connector terminal 155B, electrical quick connector 175, electrical quick connector 165, first electrical quick connector terminal 145B, first insulated electrical bus 143B is a completed connection to first power terminal (black) 141B/142B and first wire B1/B2.

Referring again to FIG. 2 by way of example, and not limitation, therein is illustrated an example embodiment of electrical outlet 120.2 and cover plate 110B. Electrical outlet 120.2 preferably includes plug receptacles 123/124, housing or body 122, and one or more electrical quick connectors 165, such as electrical quick connector (black) 165B, electrical quick connector (white) 165W, and electrical quick connector (green) 165G having electrical connector 164. It is contemplated herein that electrical quick connector 145 having electrical connector access 144 may mate, plug-in, or make an electrical connection with electrical connector 164 of electrical quick connector 165 to make up or establish an electrical receptacle 102 as electrical receptacle assembly 100 to switch on and off second electrical circuit E2. Installation of electrical switch 120.2 preferably therein universal wall box 130 may be accomplished via, screw and hole, latch, fastener, friction fit, plug-in or the like known to one of ordinary skill in the art.

In use, first load L first wire B4, first wire B3, electrical quick connector (black) 165B, first electrical quick connector terminal 145B, first insulated electrical bus 143B is a completed connection to first power terminal (black) 141B/142B and first wire B1/B2; second wire W4, second wire W3, electrical quick connector (white) 165W, second electrical quick connector terminal 145W, second insulated electrical bus 143W is a completed connection to first power terminal (white) 141W/142W and second wire W1/W2; and third wire G4, third wire G3, electrical quick connector (green) 165G, third electrical quick connector terminal 145G, third insulated electrical bus 143G, is a completed connection to first power terminal (green) 141G/142G and third wire G1/G2.

Figure 3:
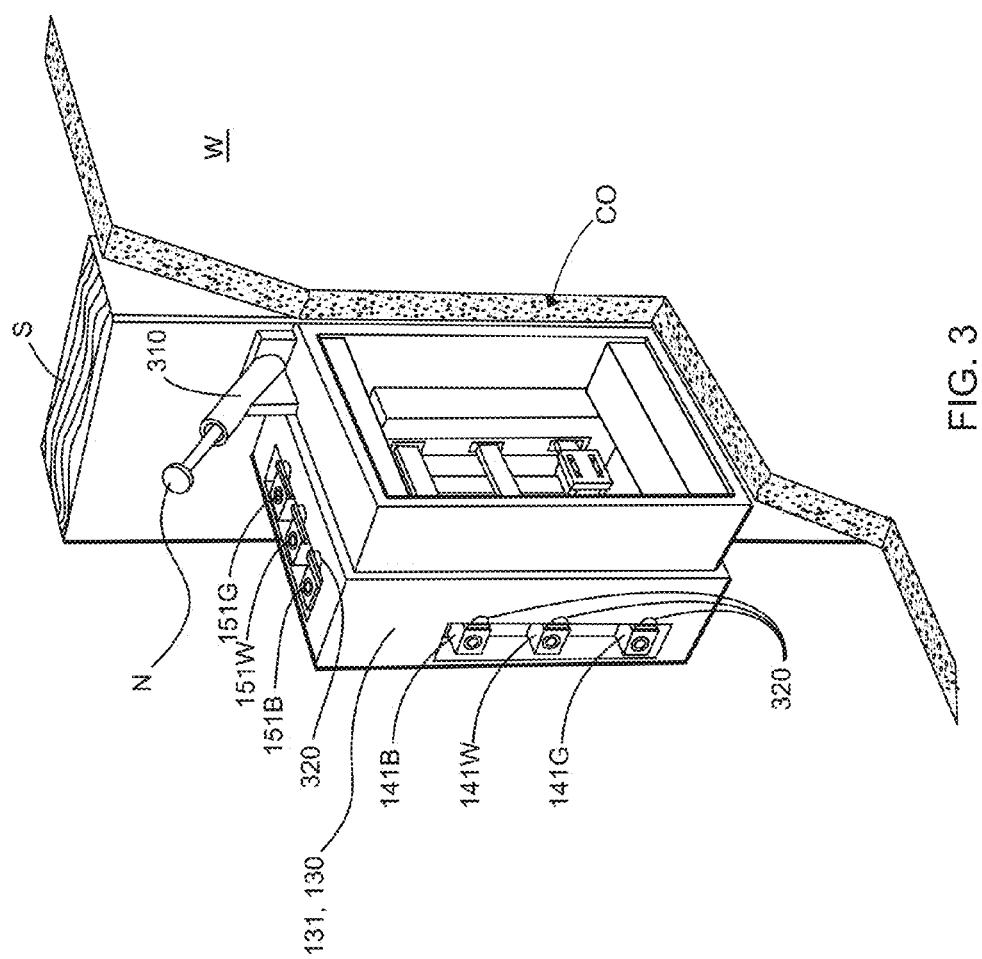
FIG. 3 is a front perspective view of an exemplary embodiment of a universal wall box, shown affixed to a stud.

Referring now to FIG. 3 by way of example, and not limitation, therein is illustrated an example embodiment universal wall box 130, wherein universal wall box 130 includes one or more attachment devices, such as nail receiver 310 affixed or integrated therein a side of universal wall box 130, such as first box side 131, second box side 132, or third box side 133. It is recognized herein that other attachment devices may be utilized, such as flaps to hold universal wall box 130 within or behind a wall board, such as drywall W. In use, a screw or nail N may be utilized to attach universal wall box 130 thereto a wall support, such as stud S within a cut out CO of drywall W. Moreover, the plurality of power terminals integrated therein, such as first power terminals 141, which includes first power terminal (black) 141B, first power terminal (white) 141W, and first power terminal (green) 141G of first box side 131 and similarly for second box side 132 and the plurality of switch terminals integrated therein, such as first switch terminals 151, which includes first switch terminal (black) 151B, first switch terminal (white) 151W, and first switch terminal (green) 151G of third box side 133, may include a group access or individual access, such as notch 320 configured to enable a user to tighten or release set screw, spring contact, stab-in or the like electrical wire connectors.

Figure 4:
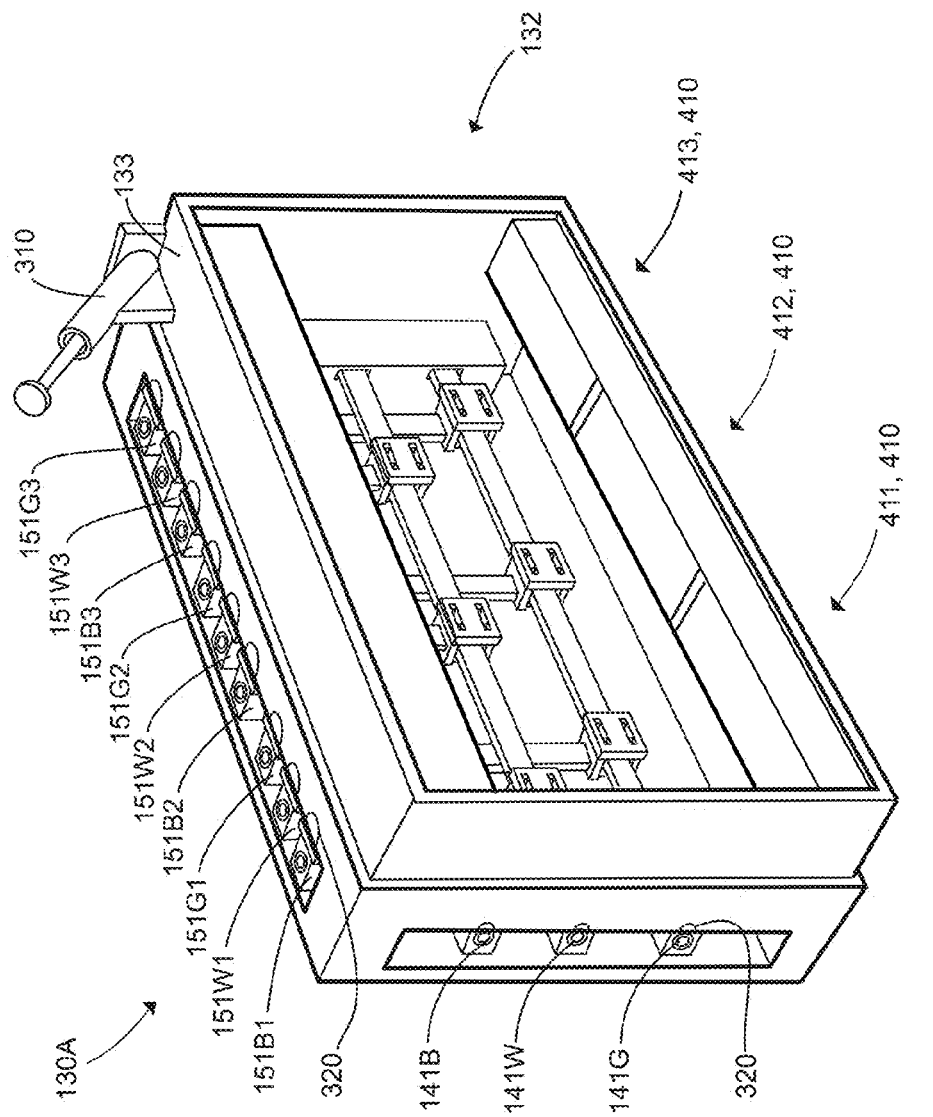
FIG. 4 is a front perspective view of an exemplary alternate embodiment of a ganged universal wall box.

Referring now to FIG. 4 by way of example, and not limitation, therein is illustrated an example embodiment ganged universal wall box 130A, wherein ganged universal wall box 130A includes one or more slots, such as bays 410 and in this example includes one or more bays, such as first bay 411, second bay 412, and third bay 413 to accommodate one selected of one or more electrical components or receptacles 120 whether electrical switch 120.1, electrical outlet 120.2, or the like in any given bay 410. Furthermore, bays 410 are configured to be powered by first power terminals 141, which includes first power terminal (black) 141B, first power terminal (white) 141W, and first power terminal (green) 141G of first box side 131 and second power terminal (black) 142B, second power terminal (white) 142W, and second power terminal (green) 142G of second box side 132 and their respective busses one or more insulated electrical busses 143, including first insulated electrical bus 143B, second insulated electrical bus 143W, and third insulated electrical bus 143G. Still furthermore, sets of plurality of switch terminals may be integrated therein third box side 133 to accommodate bays 410 switch configurations, such as for bay 411 first switch terminals 151.1, which includes first switch terminal (black) 151B1, first switch terminal (white) 151W1, and first switch terminal (green) 151G1; for bay 412 second switch terminals 151.2, which includes second switch terminal (black) 151B2, second switch terminal (white) 151W2, and second switch terminal (green) 151G2; and for bay 413 third switch terminals 151.3, which includes third switch terminal (black) 151B1, third switch terminal (white) 151W2, and third switch terminal (green) 151G3, and so on.

Figure 5:
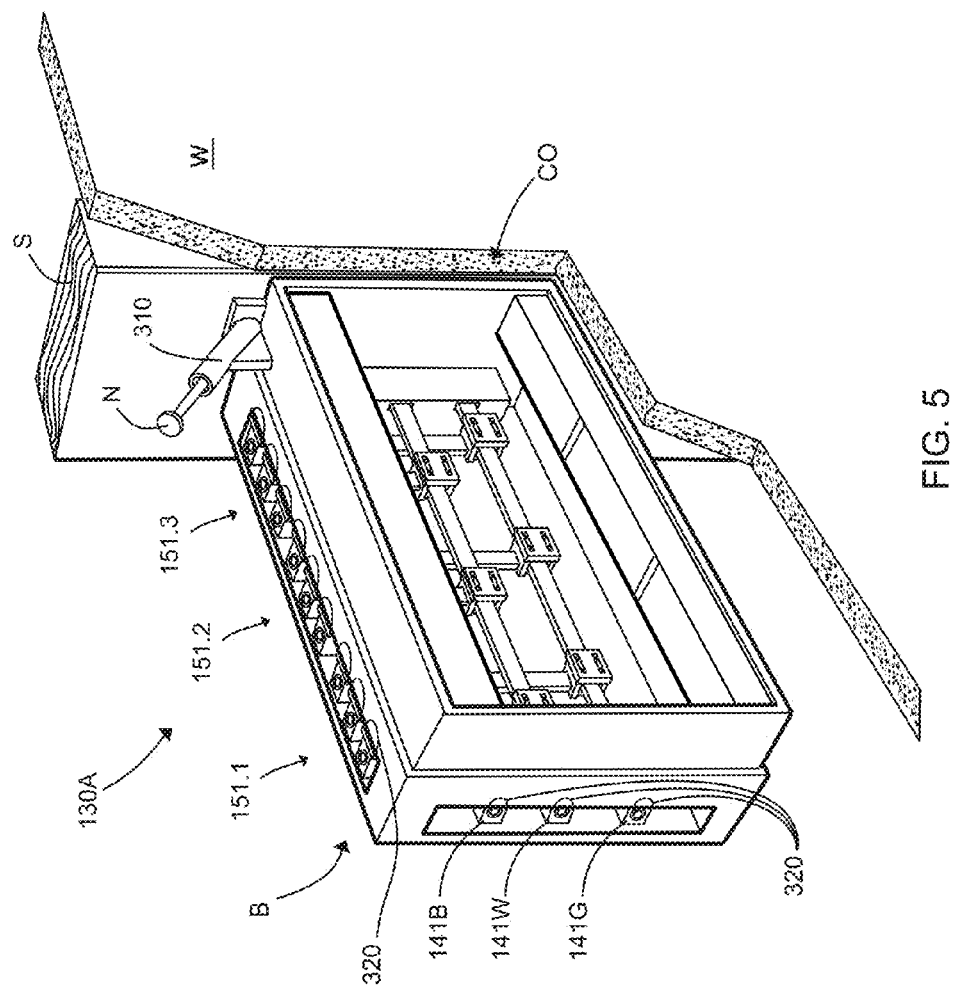
FIG. 5 is a front perspective view of an exemplary embodiment of a universal wall box of FIG. 4, shown affixed to a stud.

Referring now to FIG. 5 by way of example, and not limitation, therein is illustrated an example embodiment of ganged universal wall box 130A, wherein ganged universal wall box 130A includes one or more attachment devices, such as nail receiver 310 affixed or integrated therein a side of ganged universal wall box 130, such as first box side 131, second box side 132, or third box side 133. It is recognized herein that other attachment devices may be utilized, such as flaps to hold ganged universal wall box 130A within or behind a wall board, such as drywall W. In use, a screw or nail N may be utilized to attach ganged universal wall box 130 thereto a wall support, such as stud S within a cut out CO of drywall W. Moreover, the plurality of power terminals, first power terminals 141 and second power terminals 142, and first switch terminals 151.1 second switch terminals 151.2, third switch terminals 151.3 may include a group access or individual access, such as notch 320 configured to enable a user to tighten or release set screw, spring contact, stab-in or the like electrical wire connectors.

Referring again to FIGS. 1, 2 and 6 by way of example, and not limitation, therein is illustrated an example embodiment of ganged universal wall box 130A, with an interchangeable variety of electrical components or receptacles 120, such as electrical switch 120.1, electrical switch 120.2, and electrical outlet 120.3 and cover plate 110C. Electrical switch 120.1 is preferably wired similar to electrical switch 120.1 of FIG. 1, wherein numbering is preferably xxx.1. Installation of electrical switch 120.1 is preferably therein bay 411 of ganged universal wall box 130A. Electrical switch 120.2 is preferably wired similar to electrical switch 120.1 of FIG. 1, wherein numbering is preferably xxx.2. Installation of electrical switch 120.2 is preferably therein bay 412 of ganged universal wall box 130A. Electrical outlet 120.3 is preferably wired similar to electrical outlet 123 of FIG. 2, wherein numbering is preferably xxx.3. Installation of electrical outlet 120.3 preferably therein bay 413 of ganged universal wall box 130A.

Still furthermore, third box side 133, may include a plurality of switch terminals integrated therein, such as second/third (and so on) switch terminals 151, which includes second switch terminal (black) 151B.2, second switch terminal (white) 151W.2, and second switch terminal (green) 151G.2. Switch terminals 151 are preferably electrically connected to an insulated electrical buss, via insulated electrical tap 153, wherein first insulated electrical tap 153B.2 is preferably electrically connecting second switch terminal (black) 151B.2 thereto fourth electrical quick connector terminal 155B.2, second insulated electrical tap 153W.2 is preferably electrically connecting second switch terminal (white) 151W.2 thereto second insulated electrical bus 143W, and third insulated electrical tap 153G.2 is preferably electrically connecting second switch terminal (green) 151G.2 thereto third insulated electrical bus 143G. It is recognized herein that electrical quick-connectors 155 may be staggered thereon one or more insulated electrical tap 153 to enable electrical separation therebetween electrical quick-connectors 155/145.

It is contemplated herein wiring R3.2 having first wire B3.2, second wire W3.2, and third wire G3.2 is preferably electrically connected such as, first wire B3.2 electrically connected to second switch terminal (black) 151B.2, second wire W3.2 electrically connected to second switch terminal (white) 151W.2, and third wire G3.2 electrically connected to second switch terminal (green) 151G.2. Preferably, first wire B3.2, second wire W3.2, and third wire G3.2 power a load or resistance, such as second load L2 having first wire B4.2, second wire W4.2, and third wire G4.2, wherein first wire B4.2 is preferably electrically connected to first wire B3.2, second wire W4.2 is preferably electrically connected to second wire W3.2, and third wire G4.2 is preferably electrically connected to third wire G3.2 to make up or establish an electrical circuit or connection, such as second electrical circuit E2.

Specifically, electrical switch 120.2 preferably includes toggle 121.2, housing or body 122.2, and one or more electrical quick-connectors, such as electrical quick connector 165.2 and electrical quick connector 175.2 having electrical connector 164.2 and electrical connector blade 174.2, respectively. It is contemplated herein that electrical quick connector 145B.2 having electrical connector access 144 may mate, plug-in, or make an electrical connection with electrical connector 164.2 of electrical quick connector 165.2; and opposite or different oriented electrical quick connectors 155B.2 having electrical connector access 154 may mate, plug-in, or make an electrical connection with electrical connector blade 174.2 of electrical quick connector 175.2 to make up or establish an electrical switch 103 as electrical receptacle assembly 100 to switch on and off second electrical circuit E2. Installation of electrical switch 120.2 preferably therein bay 2 of ganged universal wall box 130A may be accomplished via, screw and hole, latch, fastener, friction fit, plug-in or the like known to one of ordinary skill in the art.

It is recognized herein that cover plate 110C may include aperture 111.2 to accommodate toggle 121.2, and is utilized to cover electrical switch 120.2.

In use, toggle 121.2 is in a first open position of an open circuit not powering second load L2 via no circuit connection between second load L2 (fourth electrical quick connector terminal 153B.2 and first electrical quick connector terminal 145B.2), whereas second load L2, second wire W4.2, second wire W3.2, second switch terminal (white) 151W.2, second insulated electrical tap 153W.2, second electrical quick connector terminal 145W.2, second insulated electrical bus 143W is a completed connection to first power terminal (white) 141W/142W and second wire W1/W2; and third wire G4.2, third wire G3.2, second switch terminal (green) 151G.2, third insulated electrical tap 153G.2, third electrical quick connector terminal 145G.2, third insulated electrical bus 143G, is a completed connection to first power terminal (green) 141G/142G and third wire G1/G2.

To complete the circuit and power second load L2, toggle 121 is moved to a second closed position of a closed circuit powering second load L2 via first wire B4.2, first wire B3.2, first switch terminal (black) 151B.2, first insulated electrical tap 153B.2, fourth electrical quick connector terminal 155B.2, electrical quick connector 175.2, electrical quick connector 165.2, first electrical quick connector terminal 145B.2, first insulated electrical bus 143B is a completed connection to first power terminal (black) 141B/142B and first wire B1/B2.

Power, neutral, and ground supplied to universal wall box 130 may be arrive via either wiring R1 or wiring R2 and respectively the other wiring R2 or wiring R1, may power the next wall box in series, and so on, respectively.

It is contemplated herein that a variety of configurations of universal wall box 130, such as single, 2× (double), 3× (triple) 4× (quad), or other multi-ganged bays of universal wall box 130, and may be utilized to accommodate, whether for commercial or residential, wiring and hook-up capabilities for a variety of configurations of electrical components or receptacles 120, such as electrical switch 120.1, electrical switch 120.2, and electrical outlet 120.3 and the like.

It is contemplated herein that ganged receptacles 120, such as electrical switch 120.1, electrical switch 120.2, and electrical outlet 120.3 and the like may contain any mix or combination of receptacles 120, such as electrical switch 120.1, electrical switch 120.2, and electrical outlet 120.3 whether switch, receptacle (pin or blade style), fan switch, dimmer, decorative switch, wireless switch, occupancy sensor switch, or the like and any combination thereof. Moreover, receptacles 120 may include electrical components meeting U.L., U.S. and foreign standard or requirements, such as 110V/120V, 220V/240V, grounded, not grounded, and the like.

It is recognized herein that cover plate 110 may include apertures 111.1/111.2/112/114 to accommodate receptacles 123/124, and is utilized to cover receptacles 120. Cover plate(s) 110 preferably includes throughholes are dimensioned to receive fasteners therethrough to removeably affix cover plate(s) 110 thereto receptacles 120.

It is contemplated herein that in universal wall box 130 and its sub components, including standard power supplies meeting U.L., U.S. and foreign standard or requirements, such as 110V/120V, 220V/240V, 277V, 480V and the like.

It is recognized herein that use of universal wall box 130 may increase the safety and to simplify wiring a set of receptacles 120.

It is contemplated herein that universal wall box 130 may contain any mix or combination of receptacles 120, such as electrical switch component and/or electrical receptacle components whether switch, receptacle (pin or blade style), fan switch, dimmer, decorative switch, wireless switch, occupancy sensor switch, or the like and any combination thereof.

Figure 7:
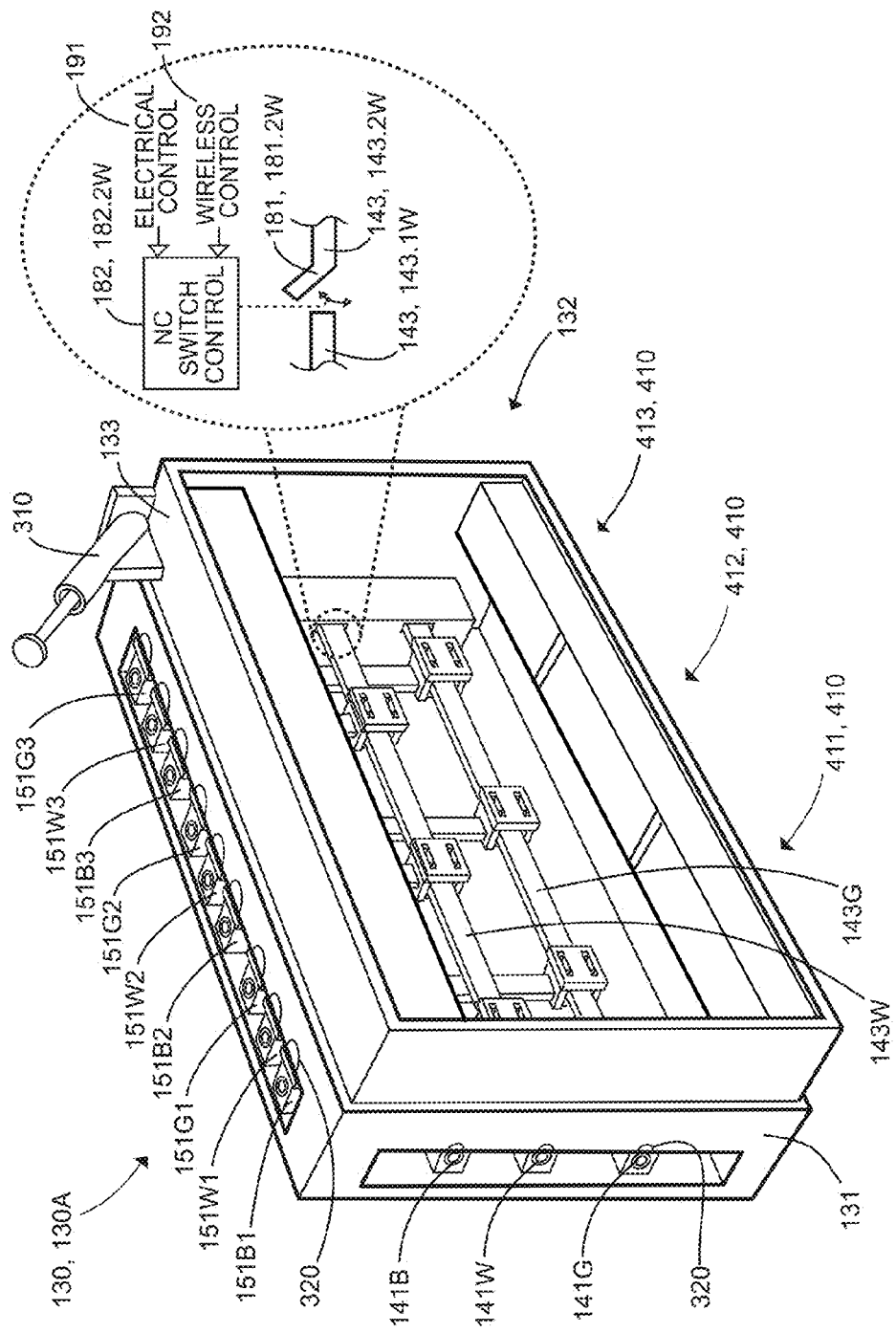
FIG. 7 is a perspective exploded view of an exemplary embodiment of the interruptible universal wall box and methods of use thereof, with an exploded view of buss interrupt switch.
Figure 8:
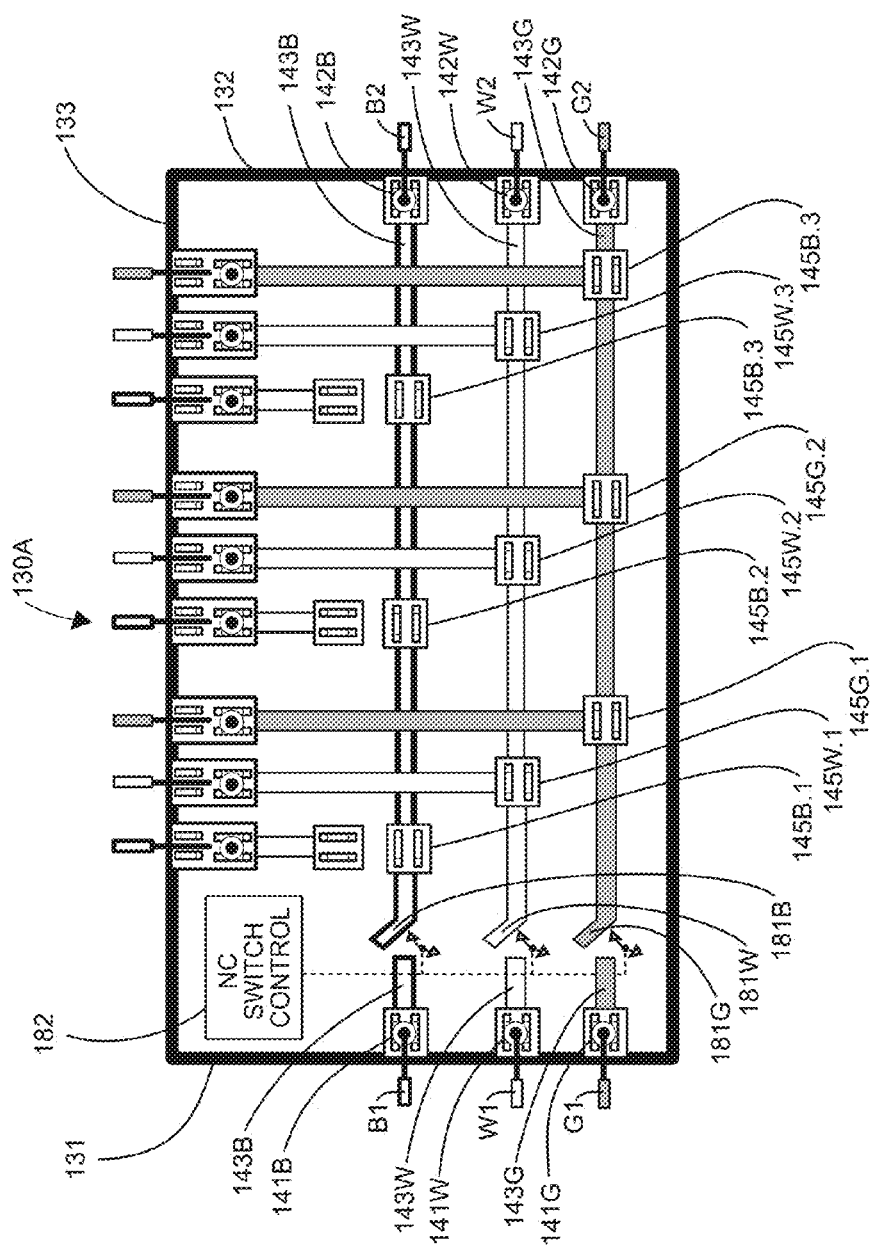
FIG. 8 is a front view of an exemplary embodiment of the interruptible universal wall box and methods of use thereof, showing the buss interrupt switch on each bus.

Referring now to FIG. 7 by way of example, and not limitation, therein is illustrated an example embodiment ganged universal wall box 130A, wherein ganged universal wall box 130A includes one or more slots, such as bays 410 and in this example includes one or more bays, such as first bay 411, second bay 412, and third bay 413 to accommodate one selected of one or more electrical components or receptacles 120 whether electrical switch 120.1, electrical outlet 120.2, or the like in any given bay 410. Furthermore, bays 410 are configured to be powered by first power terminals 141, which includes first power terminal (black) 141B, first power terminal (white) 141W, and first power terminal (green) 141G of first box side 131 and second power terminal (black) 142B, second power terminal (white) 142W, and second power terminal (green) 142G of second box side 132 (shown in FIG. 6) and their respective busses one or more insulated electrical busses 143, including first insulated electrical bus 143B (shown in FIG. 6), second insulated electrical bus 143W, and third insulated electrical bus 143G. Still furthermore, sets of plurality of switch terminals may be integrated therein third box side 133 to accommodate bays 410 switch configurations, such as for bay 411 first switch terminals 151.1, which includes first switch terminal (black) 151B1, first switch terminal (white) 151W1, and first switch terminal (green) 151G1; for bay 412 second switch terminals 151.2, which includes second switch terminal (black) 151B2, second switch terminal (white) 151W2, and second switch terminal (green) 151G2; and for bay 413 third switch terminals 151.3, which includes third switch terminal (black) 151B1, third switch terminal (white) 151W2, and third switch terminal (green) 151G3, and so on.

Furthermore, ganged universal wall box 130/130A may include one or more interrupt, disrupt, or on/off switch, such as bus switch 181. Bus switch 181 may be positioned or incorporated anywhere along and electrically integrated in any of the one or more insulated electrical busses 143 (single switch bus), and alternatively one or more bus switch 181 may be positioned or incorporated anywhere along and electrically integrated in any of the one or more insulated electrical busses 143 (multi-switch bus), such as first insulated electrical bus 143B, second insulated electrical bus 143W, or third insulated electrical bus 143G. For example, bus switch 181 may be positioned in or proximate bays 410 including one or more bays, such as first bay 411, second bay 412, and third bay 413 to enable electrical interrupt, disrupt, disconnect, or on/off switch capability for individual bays 410 and interchangeable variety of electrical components or receptacles 120, such as electrical switch 120.1, electrical switch 120.2, and electrical outlet 120.3 electrically connected therein each of bays 410 shown in FIG. 6.

Referring again to FIG. 7 by way of example, and not limitation, therein is illustrated in an exploded view an example embodiment of bus switch 181 shown in an open position however, bus switch 181 preferably includes a normally closed bus switch capable of opening and closing to interrupt or connect one of insulated electrical busses 143 (multi-switch bus) therein ganged universal wall box 130A/130, such as first insulated electrical bus 143B, second insulated electrical bus 143W, or third insulated electrical bus 143G. Bus switch 181 may be controlled by a controller, control a position or state of, change a position, such as switch control 182 having control inputs via a wired control signal, such as electrical control 191 or via wireless communication signal (wireless access, Bluetooth or other IEEE standard), such as wireless control 192. Preferably switch control 182 receives a signal from electrical control 191 or wireless control 192 and processes such with memory and a central processing unit, to electrically open or close (position) bus switch 181 and switch control 182 electrically opens or closes (change position) bus switch 181, respectively. For example, if switch control 182.2W receives a signal from electrical control 191 or wireless control 192 to open bus switch 181.2W then switch control 182.2W opens bus switch 181.2W, thus interrupting second insulated electrical bus 143.1W from second insulated electrical bus 143.2W and electrically disrupting power to one or more electrical components or receptacles 120 whether electrical switch 120.1, electrical outlet 120.2 electrically connected therein each of bays 410 shown in FIG. 6. Alternatively if switch control 182.2W receives a signal from electrical control 191 or wireless control 192 to open bus switch 181.2W then switch control 182.2W opens bus switch 181.2W, thus connecting second insulated electrical bus 143.1W to second insulated electrical bus 143.2W and powering one or more electrical components or receptacles 120 whether electrical switch 120.1, electrical outlet 120.2 electrically connected therein each of bays 410 shown in FIG. 6.

It is contemplated herein that one or more electrical components or receptacles 120 whether electrical switch 120.1, electrical outlet 120.2 electrically connected therein each of bays 410 shown in FIG. 6 may include internet, phone, or other communication cable as receptacles 120 wherein switch control 182 opening or closing of receptacles 120 interrupts or provides service of internet, phone, or other communication cable via ganged universal wall box 130A/130.

It is further contemplated herein that switch control 182 may be controlled via internet with an IP addressable ganged universal wall box 130A/130 or wireless with transmit and receive functionality communicating directly with a device such as a smart phone, tablet, laptop, computer or the like communicating via smart phone application or website communicating through electrical control 191 or wireless control 192 or communicating with such devices via wireless connection to the Internet.

It is still further contemplated herein that user(s) whether home or business owner, parent, apartment owner, police, rescue personnel or the like may interrupt, disable or power down electrical components or receptacles 120, individual ganged universal wall box 130A/130, set of ganged universal wall box 130A/130, room of ganged universal wall box 130A/130, unit of ganged universal wall box 130A/130, floor of ganged universal wall box 130A/130, building or home ganged universal wall box 130A/130.

Referring again to FIG. 8 by way of example, and not limitation, therein is illustrated an example embodiment of ganged universal wall box 130A, capable of receiving an interchangeable variety of electrical components or receptacles 12. Ganged universal wall box 130A may include first box side 131, second box side 132, and third box side 133.

Moreover, exterior surface, such as first box side 131 may include a plurality of power wiring terminals integrated therein, such as first power terminals 141, which includes first power terminal (in/black/hot/first) 141B, first power terminal (in/white/neutral/second) 141W, and first power terminal (in/green/ground/third) 141G. Furthermore, exterior surface, such as second box side 132 may include a plurality of power terminals integrated therein, such as second power terminals 142, which includes second power terminal (out/black/hot/first) 142B, second power terminal (out/white/neutral/second) 142W, and second power terminal (out/green/ground/third) 142G. First power terminals 141 and second power terminals 142 may be configured as releasable electrical wire terminals using set screw, spring contact, stab-in or the like electrical wire connectors. Positioned therebetween and electrically connecting each of first power terminals 141 and second power terminals 142 is preferably positioned one or more insulated electrical busses 143, wherein first insulated electrical bus 143B is preferably positioned therebetween and electrically connecting first power terminal (black) 141B thereto second power terminal (black) 142B, second insulated electrical bus 143W is preferably positioned therebetween and electrically connecting first power terminal (white) 141W thereto second power terminal (white) 142W, and third insulated electrical bus 143G is preferably positioned therebetween and electrically connecting first power terminal (green) 141G thereto second power terminal (green) 142G. Preferably, each of the one or more insulated electrical busses 143 preferably includes first electrical quick-connector or at least three electrical outlet connectors exposed to an interior surface 134, such as a first electrical quick connector 145 having one or more openings, such as electrical connector access 144 to access an uninsulated portion of one or more insulated electrical busses 143, such as first electrical or outlet quick connector terminal 145B(.1,.2,.3) electrically connected thereto first insulated electrical bus 143B, second electrical or outlet quick connector terminal 145W(.1,.2,.3) electrically connected thereto second insulated electrical bus 143W, and third electrical or outlet quick connector terminal 145G(.1,.2,.3) electrically connected thereto third insulated electrical bus 143G. It is recognized herein that electrical quick-connectors 145 may be staggered thereon one or more insulated electrical busses 143 to enable electrical separation therebetween electrical quick connectors 145.

Furthermore, ganged universal wall box 130/130A may include one or more electrical interrupt, disrupt, disconnect, or on/off switch, such as bus switch 181 and more specifically bus switch 181B, 181W, and 181G. Bus switch 181 may be positioned or incorporated anywhere along and electrically integrated in any of the one or more insulated electrical busses 143 (single switch bus), and alternatively one or more bus switch 181 may be positioned or incorporated anywhere along and electrically integrated in any of the one or more insulated electrical busses 143 (multi-switch bus), such as first insulated electrical bus 143B, second insulated electrical bus 143W, or third insulated electrical bus 143G. For example, bus switch 181 may be positioned in or proximate bays 410 including one or more bays, such as first bay 411, second bay 412, and third bay 413, shown in FIG. 7 to enable electrical interrupt, disrupt, disconnect, or on/off switch capability for individual bays 410 and interchangeable variety of electrical components or receptacles 120, such as electrical switch 120.1, electrical switch 120.2, and electrical outlet 120.3 electrically connected therein each of bays 410 shown in FIG. 6.

It is contemplated herein that bus switch 181 may be positioned or incorporated anywhere along and electrically integrated in any of the one or more first insulated electrical tap 153, and alternatively one or more bus switch 181 may be positioned or incorporated anywhere along and electrically integrated in any of the one or more first insulated electrical tap 153, such as first insulated electrical tap 153B), second insulated electrical tap 153W and third insulated electrical tap 153G.

Referring again to FIG. 8 by way of example, and not limitation, therein is illustrated bus switch 181 shown in an open position however, bus switch 181 preferably includes a normally closed bus switch capable of opening and closing to interrupt or electrically connect one of insulated electrical busses 143 (multi-switch bus) therein ganged universal wall box 130A/130, such as first insulated electrical bus 143B via bus switch 181B, second insulated electrical bus 143W via bus switch 181W, or third insulated electrical bus 143G via bus switch 181G. Bus switch 181 may be controlled by a controller, such as switch control 182 having control inputs via a wired control signal, such as electrical control 191 or via wireless communication signal, such as wireless control 192, shown in FIG. 7. Preferably switch control 182 receives a signal from electrical control 191 or wireless control 192 to open or close bus switch 181 and switch control 182 electrically opens or closes bus switch 181, respectively. For example, if switch control 182 receives a signal from electrical control 191 or wireless control 192 to open bus switch 181W then switch control 182 opens bus switch 181W, thus electrically interrupting second insulated electrical bus 143W and electrically disrupting power to one or more electrical components or receptacles 120 whether electrical switch 120.1, electrical outlet 120.2 electrically connected therein each of bays 410 shown in FIG. 6 which are connected thereto electrical bus 143W, and thus, powering off or interrupting universal wall box 130/130A. Alternatively if switch control 182 receives a signal from electrical control 191 or wireless control 192 to open bus switch 181B then switch control 182 opens bus switch 181B, thus electrically interrupting second insulated electrical bus 143B and electrically disrupting power to one or more electrical components or receptacles 120 whether electrical switch 120.1, electrical outlet 120.2 electrically connected therein each of bays 410 shown in FIG. 6 which are connected thereto electrical bus 143B, and thus, powering off or interrupting universal wall box 130/130A. Electrical bus 143B may be interrupter in a similar manner.

It is contemplated herein that a plurality of bus switch 181 may be electrically connected therein each of bays 410 shown in FIG. 6 for any of electrical bus 143B/143W/141G to enable isolation and switching capabilities directed to a specific bay of bays 410 shown in FIG. 6, such as, such as first bay 411, second bay 412, and third bay 413, shown in FIG. 7 to enable electrical interrupt, disrupt, disconnect, or on/off switch capability for individual bays 410 and interchangeable variety of electrical components or receptacles 120, such as electrical switch 120.1, electrical switch 120.2, and electrical outlet 120.3 electrically connected therein each of bays 410 shown in FIG. 6.

Figure 9:
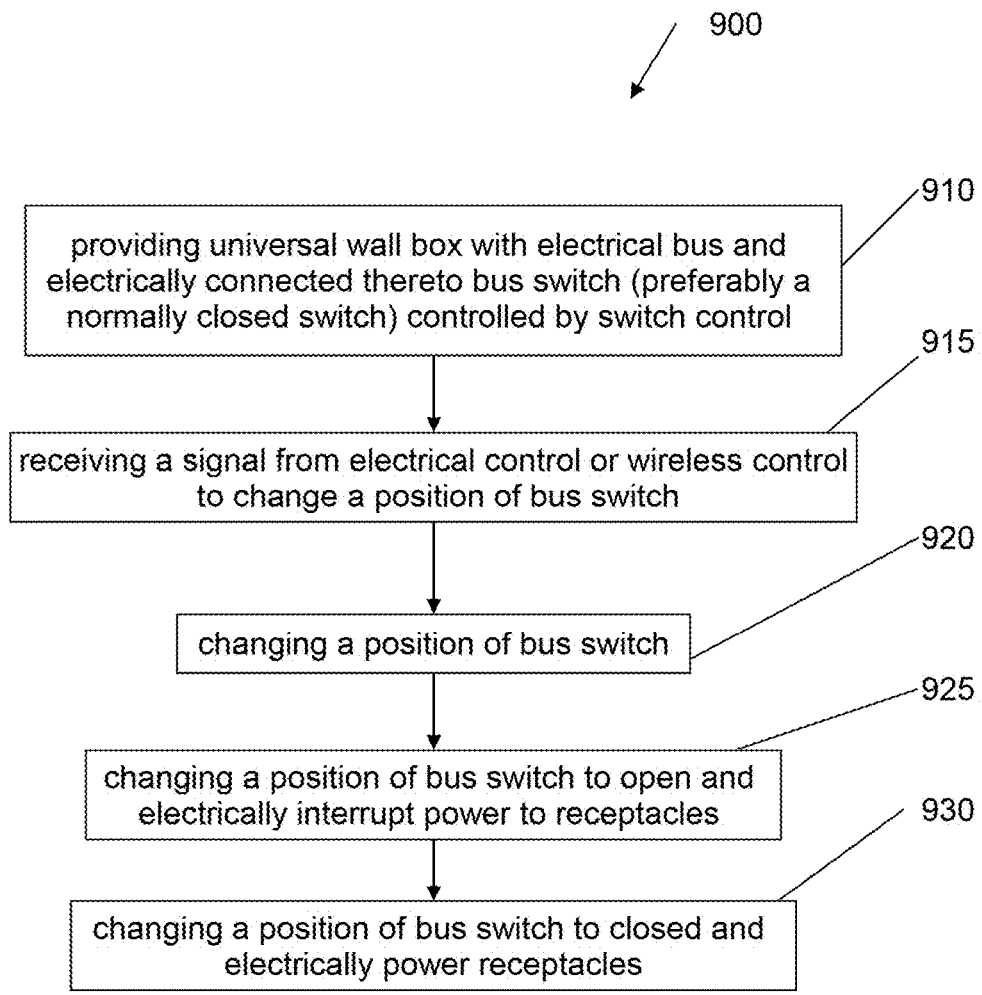
FIG. 9 is a flow chart depicting an exemplary embodiment of the method of opening and closing a bus switch to electrically power or disable a universal wall box.

Referring now to FIG. 9, there is illustrated a flow diagram 900 of a method of utilizing universal wall box 130/130A. In block or step 910, providing universal wall box 130/130A with electrical bus 143 and electrically connected thereto bus switch 181 (preferably a normally closed switch) controlled by switch control 182. In block or step 915 receiving a signal from electrical control 191 or wireless control 192 to change a position of bus switch 181, such as to electrically open or close bus switch 181. In block or step 920 changing a position of bus switch 181. In block or step 925 changing a position of bus switch 181 to electrically open, interrupt, disrupt, disconnect, or turn off switch capability for individual bays 410 and electrically interrupt, disrupt, disconnect, or turn off interchangeable variety of electrical components or receptacles 120, such as electrical switch 120.1, electrical switch 120.2, and electrical outlet 120.3 electrically connected therein each of bays 410 shown in FIG. 6. In block or step 930 changing a position of bus switch 181 to electrically close, enable, or turn on, or power on switch capability for individual bays 410 and enable, or turn on interchangeable variety of electrical components or receptacles 120, such as electrical switch 120.1, electrical switch 120.2, and electrical outlet 120.3 electrically connected therein each of bays 410 shown in FIG. 6.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A universal wall box, said universal wall box comprising:
   an open side electrical box having a plurality of sets of power wiring terminals integral to an exterior of one or more box surfaces of said electrical box, wherein each said set of power wiring terminals are electrically connected to one of a plurality of internal insulated distribution busses integrated within said one or more box surfaces of said electrical box, wherein at least one of said internal insulated distribution busses includes one or more bus switches, and wherein each of said internal insulated distribution busses includes one or more first quick-connector electrically connected thereto and exposed to an interior of said one or more box surfaces; and
   a plurality of switch wiring terminals integral to said exterior of said one or more box surfaces of said electrical box, wherein each of said switch wiring terminals are electrically connected to one of a plurality of insulated electrical taps integrated within said one or more box surfaces of said electrical box, and wherein at least one of said plurality of insulated electrical taps includes at least one second quick-connector electrically connected thereto and exposed to an interior of said one or more box surfaces,
   and wherein each of at least two or more of said plurality of insulated electrical taps is electrically connected to one of said plurality of internal insulated distribution busses via one of said one or more first quick-connector.

2. The universal wall box of claim 1, further comprising one or more pluggable electrical receptacles, each of said one or more pluggable electrical receptacles includes two or more third quick-connectors configured to electrically connect each of said two or more third quick-connectors to said one or more first quick-connector or said at least one second quick-connector.

3. The universal wall box of claim 2, further comprising a cover plate having at least two sets of apertures that includes at least one throughhole and at least one electrical receptacle.

4. The universal wall box of claim 2, wherein said one or more pluggable electrical receptacles comprises an electrical switch having at least two electrical switch quick-connectors, including a first electrical switch quick connector and a second electrical switch quick connector.

5. The universal wall box of claim 4, wherein said first electrical switch quick connector electrically connected to one of said one or more first quick-connector and said second electrical switch quick connector electrically connected to one of said at least one second quick-connector.

6. The universal wall box of claim 5, wherein said one or more first quick-connector, includes a first connector access and said at least one second quick-connector includes a second connector access.

7. The universal wall box of claim 6, wherein said first electrical switch quick-connector and second electrical switch quick-connector include one or more connector blades, including a first connector blade and a second connector blade.

8. The universal wall box of claim 7, wherein said first connector blade and a second connector blade electrically connects to said first connector access and said second connector access.

9. The universal wall box of claim 8, wherein said first connector blade and said first connector access are oriented different from said second connector blade and said second connector access.

10. The universal wall box of claim 2, wherein said one or more pluggable electrical receptacles comprises an outlet having at least three electrical outlet quick connectors, including first electrical outlet quick connector, second electrical outlet quick connector, and third electrical outlet quick connector.

11. The universal wall box of claim 10, wherein said first electrical outlet quick connector electrically connected to a first of said one or more first quick-connector, said second electrical outlet quick connector electrically connected to second of said one or more first quick-connector, said third electrical outlet quick connector electrically connected to third of said one or more first quick-connector.

12. The universal wall box of claim 11, wherein said first electrical outlet quick connector, includes a first connector access, said second electrical outlet quick connector, includes a second connector access, and said second electrical outlet quick connector, includes a third connector access.

13. The universal wall box of claim 12, wherein said first electrical outlet quick connector, second electrical outlet quick connector, and said second electrical outlet quick connector include one or more connector blades, including a first connector blade, a second connector blade, and a third connector blade.

14. The universal wall box of claim 13, wherein said first connector blade electrically connected to said first connector access, said second connector blade electrically connected to said second connector access, and said third connector blade electrically connected to said third connector access.

15. The universal wall box of claim 1, wherein said set of power wiring terminals further comprises a first power in terminal, second power in terminal, and a third power in terminal.

16. The universal wall box of claim 15, wherein said set of power wiring terminals further comprises a first power out terminal, second power out terminal, and a third power out terminal.

17. The universal wall box of claim 16, further comprising one or more power wires, each of said one or more power wires having a neutral power wire, a ground power wire and at least one hot power wire, wherein a first power wire of said one or more power wires includes a first said at least one hot power wire in electrical communication with said first power in terminal, a first said neutral power wire in electrical communication with said second power in terminal, and a first said ground power wire in electrical communication with said third power in terminal.

18. The universal wall box of claim 17, wherein a second power wire of said one or more power wires includes a second said at least one hot power wire in electrical communication with said first power out terminal, a second said neutral power wire in electrical communication with said second power out terminal, and a second said ground power wire in electrical communication with said third power out terminal.

19. The universal wall box of claim 1, wherein said plurality of switch wiring terminals further comprises a first switch terminal, second switch terminal, and a third switch terminal.

20. The universal wall box of claim 19, further comprising at least one switch wire, each of said at least one switch wire having a neutral switch wire, a ground switch wire, and at least one hot switch wire, wherein said at least one hot switch wire in electrical communication with said first switch terminal, said neutral switch wire in electrical communication with said second switch terminal, and said ground switch wire in electrical communication with said third switch terminal.

21. The universal wall box of claim 1, further comprising a switch control configured to change a position of said one or more bus switches.

22. The universal wall box of claim 21, wherein said switch control is configured to change at least one of said one or more bus switches to an open position.

23. The universal wall box of claim 21, wherein said switch control is configured to receive a control signal.

24. A ganged universal wall box, said ganged universal wall box comprising:
  an open side electrical box having a plurality of sets of power wiring terminals integral to an exterior of one or more box surfaces of said electrical box, wherein each said set of power wiring terminals are electrically connected to one of a plurality of internal insulated distribution busses integrated within said one or more box surfaces of said electrical box, wherein at least one of said internal insulated distribution busses includes one or more bus switches, and
  one or more bays within said open side electrical box, each said bay includes:
    one or more first quick-connector electrically connected thereto said internal insulated distribution busses and exposed to an interior of said one or more box surfaces; and
    a plurality of switch wiring terminals integral to said exterior of said one or more box surfaces of said electrical box, wherein each of said switch wiring terminals are electrically connected to one of a plurality of insulated electrical taps integrated within said one or more box surfaces of said electrical box, and wherein at least one of said plurality of insulated electrical taps includes at least one second quick-connector electrically connected thereto and exposed to an interior of said one or more box surfaces,
  and wherein each of at least two or more of said plurality of insulated electrical taps is electrically connected to one said plurality of internal insulated distribution busses via one of said one or more first quick-connector.

25. The ganged universal wall box of claim 24, further comprising one or more pluggable electrical receptacles, each of said one or more pluggable electrical receptacles includes two or more third quick connectors configured to electrically connect each of said two or more third quick connectors to said one or more first quick-connector or said at least one second quick-connector.

26. The ganged universal wall box of claim 25, further comprising a cover plate having at least two sets of apertures that includes at least one throughhole and at least one electrical receptacle.

27. The universal wall box of claim 24, further comprising a switch control configured to change a position of said one or more bus switches.

28. The universal wall box of claim 27, wherein said switch control is configured to change at least one of said one or more bus switches to an open position.

29. The universal wall box of claim 27, wherein said switch control is configured to receive a control signal.

30. A method of powering on and off a universal wall box, said method comprising the steps of:
  providing an open side electrical box having a plurality of sets of power wiring terminals integral to an exterior of one or more box surfaces of said electrical box, wherein each said set of power wiring terminals are electrically connected to one of a plurality of internal insulated distribution busses integrated within said one or more box surfaces of said electrical box, wherein at least one of said internal insulated distribution busses includes one or more bus switches, and wherein each of said internal insulated distribution busses includes one or more first quick-connector electrically connected thereto and exposed to an interior of said one or more box surfaces; and a plurality of switch wiring terminals integral to said exterior of said one or more box surfaces of said electrical box, wherein each of said switch wiring terminals are electrically connected to one of a plurality of insulated electrical taps integrated within said one or more box surfaces of said electrical box, and wherein at least one of said plurality of insulated electrical taps includes at least one second quick-connector electrically connected thereto and exposed to an interior of said one or more box surfaces, and wherein each of at least two or more of said plurality of insulated electrical taps is electrically connected to one of said plurality of internal insulated distribution busses via one of said one or more first quick-connector, and comprising a switch control configured to change a position of said one or more bus switches; and
  changing a position of said one or more bus switches.

31. The method of claim 30, further comprising the step of receiving a control signal therein said switch control.

32. The method of claim 31, further comprising the step of changing a position of said one or more bus switches to an open position based on said control signal.

33. The method of claim 31, further comprising the step of changing a position of said one or more bus switches to a closed position based on said control signal.

* * * * *